United States Patent
Tanaka et al.

(10) Patent No.: US 7,153,897 B2
(45) Date of Patent: Dec. 26, 2006

(54) FLAME-RETARDANT SEAMLESS BELT, METHOD OF MANUFACTURING FLAME-RETARDANT SEAMLESS BELT, AND IMAGE-FORMING APPARATUS HAVING FLAME-RETARDANT SEAMLESS BELT

(75) Inventors: Masakazu Tanaka, Hyogo (JP); Takayuki Hattori, Hyogo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 371 days.

(21) Appl. No.: 10/749,519

(22) Filed: Jan. 2, 2004

(65) Prior Publication Data

US 2004/0143042 A1    Jul. 22, 2004

(30) Foreign Application Priority Data

Jan. 8, 2003    (JP) .............................. 2003-002456

(51) Int. Cl.
- *B32B 7/02* (2006.01)
- *B32B 27/06* (2006.01)
- *B32B 27/18* (2006.01)
- *B32B 27/36* (2006.01)
- *C08K 5/3492* (2006.01)

(52) U.S. Cl. ...................... 524/100; 524/236; 428/212; 428/213; 428/215; 428/334; 428/480; 264/299

(58) Field of Classification Search ................ 428/480, 428/334, 212, 213, 215; 264/299; 524/100, 524/236

See application file for complete search history.

(56) References Cited

U.S. PATENT DOCUMENTS 6,132,828 A * 10/2000 Yasui et al. .............. 428/36.91
2005/0095444 A1 * 5/2005 Tanaka et al. .............. 428/480

FOREIGN PATENT DOCUMENTS

JP        2002-304064 A    10/2002

* cited by examiner

*Primary Examiner*—Kriellion Sanders
(74) *Attorney, Agent, or Firm*—Birch, Stewart, Kolasch, and Birch, LLP

(57) ABSTRACT

A flame-retardant seamless belt is formed by molding a thermoplastic composition containing a polyester thermoplastic elastomer as a main component thereof; at not less than 15 wt % nor more than 40 wt % of melamine cyanurate for a whole weight of the thermoplastic composition; and not less than 0.01 parts by weight nor more than three parts by weight of an anion-containing salt, shown by a chemical formula 1, for 100 parts by weight of an entire polymer component. The thermoplastic composition has a volume resistivity of not less than $1.0 \times 10^6 \Omega \cdot cm$ nor more than $1.0 \times 10^{12} \Omega \cdot cm$. The flame-retardant seamless belt is used as an intermediate transfer belt (33) or the like for use in an image-forming apparatus such as a copying apparatus, a facsimile, a printer, and the like.

14 Claims, 2 Drawing Sheets

FLAME-RETARDANT SEAMLESS BELT, METHOD OF MANUFACTURING FLAME-RETARDANT SEAMLESS BELT, AND IMAGE-FORMING APPARATUS HAVING FLAME-RETARDANT SEAMLESS BELT

This Nonprovisional application claims priority under 35 U.S.C. § 119(a) on Patent Application Ser. No(s). 2003-002456 filed in Japan on Jan. 8, 2003, the entire contents of which are hereby incorporated by reference.

BACKGROUND OF THE INVENTION

Field of the Invention

The present invention relates to a flame-retardant seamless belt, a method of manufacturing the flame-retardant seamless belt, and an image-forming apparatus having the flame-retardant seamless belt. More particularly, the present invention is intended to improve materials for forming the seamless belt for use in the image-forming apparatus such as a copying apparatus, a facsimile, a printer, and the like for forming an image by an electrophotographic method or an electrostatic printing method. This is to impart fire retardance to the seamless belt and reduce the electric resistance thereof to thereby realize a preferable image reliably.

The conductive seamless belt is used as a transport belt, a transfer belt, an intermediate transfer belt, a fixing belt, a developing belt, and the base belt of a photosensitive member. These belts are used in the image-forming apparatus such as the copying apparatus, the facsimile, the printer, and the like for forming an image by the electrophotographic method or the electrostatic printing method.

It is necessary to allow the conductive seamless belt to have a proper stable electric resistance. Thus to impart electric conductivity to these belts, a method of using an electroconductive composition containing an electroconductive filler such as powder of metal oxides or carbon black in its polymer is known. A method of using an ionic-conductive elastomer composition containing an ionic-conductive filler in its polymer is also known. In addition, various proposals for controlling the electric resistance of the belts of this kind have been made.

For example, a conductive endless belt (seamless belt) is disclosed in Japanese Patent Application Laid-Open No. 2002-304064. This conductive endless belt is composed of a resinous composition containing at least one kind of thermoplastic resin and at least one kind of hydrophilic resin not compatible with the thermoplastic resin. The resinous composition is extruded to form the conductive endless belt. The viscosity of the thermoplastic resin is set higher than that of the hydrophilic resin at the extrusion temperature.

In recent years, the conductive seamless belt is demanded to be flame-retardant in consideration of environment. Normally, the conductive seamless belt is mounted inside equipment or inside an apparatus such as the image-forming apparatus. Because the conductive seamless belt is subjected to a high voltage and temperature, it is necessary to consider the flammability thereof. Therefore there is a fear that if the conductive seamless belt is flammable and insufficiently flame-retardant, the use state thereof is restricted in dependence on the condition of environment inside the image-forming apparatus. Conductive belts manufactured currently are good in performance thereof such as its electric conductivity and durability. Thus they can be used in normal use without fear. However, there is still room for improvement in fire retardance thereof.

To make the conductive seamless belt composed of the thermoplastic resin flame-retardant, a flame-retardant additive is added to the polymer component of the thermoplastic resin. A halogen-containing flame-retardant additive, a phosphate ester-containing flame-retardant additive, and the like are added to the polymer component of the thermoplastic resin.

When the belt contains the halogen-containing flame-retardant additive, toxic gases such as dioxin may be generated when the belt is subjected to a high temperature. When the belt containing the phosphate ester-containing flame-retardant additive is used at a high temperature for a long time, the phosphate ester-containing flame-retardant additive oozes out to the surface of the belt, thus staining a photosensitive member or the like.

In the case where the electroconductive polymer composition containing the electroconductive filler such as the carbon black is used to impart electric conductivity to the belt, the flow (intensity) of electric current changes in dependence on the dispersion state of particles of the conductive filler. Thus if there is a variation in the dispersion state of particles, it is difficult to control the electric resistance of the belt. Consequently there is a large variation in the electric resistance inside the belt. With a secondary aggregation of particles, there is a larger variation in the electric resistance. Carbon black makes the belt black, which makes it difficult to visually detect the stain of the belt.

In the case where the belt is made electroconductive by the use of the metal oxide, for example, conductive zinc white, the belt is frail if the charging amount thereof increases to realize a low electric resistance. There is a problem in the dispersion state of particles of the electroconductive filler. Thus it is difficult to control the electric resistance. It is very difficult to adjust the electric resistance of the belt to $10^4 \Omega \cdot cm$ to $10^{12} \Omega \cdot cm$.

If the polymer composition of the ionic-conductive belt contains a low-molecular-weight antistatic agent having a function of a surface-active agent, there is a fear that bleeding causes stain of an OPC (organic photoconductor). If the polymer composition is very hygroscopic, the electric resistance changes greatly owing to a change of humidity. It is difficult to handle sodium perchlorate ($NaClO_4$) in kneading it with a thermoplastic elastomer. In addition, the sodium perchlorate is expensive. The ionic-conductive belt has another problem that its volume resistivity depends greatly on environment. In this case, it is difficult to control a transfer voltage, which makes the mechanism of the image-forming apparatus complicated.

As apparent from the foregoing description, in the development of the seamless belt, the demand for imparting fire retardance to the seamless belt for use in the image-forming apparatus has priority over demands for the seamless belt. More specifically, that the conductive seamless belt is demanded to be flame-retardant without using the flame-retardant additive containing halogen so that the conductive seamless belt does not pollute environment and does not stain the photosensitive member in use. There is another demand that the electric resistance of the conductive seamless belt can be adjusted easily and the electric resistance inside the conductive seamless belt has a small variation. Above all, the conductive seamless belt is demanded to have a low degree of dependence on environment in its electric resistance.

SUMMARY OF THE INVENTION

The present invention has been made in view of the above-described problems. Therefore it is an object of the present invention to provide a flame-retardant conductive belt which has preferable fire retardance provided without adversely affecting its other performances such as electric conductivity, can be easily adjusted easily in its electric resistance, has slight variations in an electric resistance inside the belt, and has a low degree of dependence on environment in its electric resistance.

It is another object of the present invention to provide a image-forming apparatus which has preferable electric characteristics and thus provides an image not nonuniform in its quality.

To achieve the object of the present invention, there is provided a flame-retardant seamless belt composed of a thermoplastic composition containing a polyester thermoplastic elastomer as a main component thereof; at not less than 15 wt % nor more than 40 wt % of melamine cyanurate, serving as a flame-retardant additive, for a whole weight of the thermoplastic composition; and not less than 0.01 parts by weight nor more than three parts by weight of an anion-containing salt, shown by a chemical formula 1 shown below, for 100 parts by weight of an entire polymer component.

The thermoplastic composition has a volume resistivity of not less than $1.0 \times 10^6 \Omega \cdot cm$ nor more than $1.0 \times 10^{12} \Omega \cdot cm$.

Chemical Formula 1

where $X_1$ and $X_2$ denote functional group, containing C, —F, and —$SO_2$—, whose number of carbon atoms is one to eight.

As a result of their energetic studies, the present inventors have found that when the melamine cyanurate is contained as the flame-retardant additive in the seamless belt whose main component is the polyester thermoplastic elastomer, the melamine cyanurate does not adversely affect the volume resistivity of a seamless belt composed of the thermoplastic composition nor the degree of dependence of the volume resistivity thereof on environment, i.e., does not change the electric resistance thereof. That is, they have found that the melamine cyanurate is capable of imparting fire retardance to the belt without deteriorating the electric conductivity thereof. Because the decomposition temperature of the melamine cyanurate is not less than 300° C., the melamine cyanurate is present in the form of powder up to 300° C. Thus the melamine cyanurate does not bleed or bloom on the surface of the belt in a temperature range in which the image-forming apparatus is used and thus does not stain the photosensitive member. The melamine cyanurate is a nitrogen-containing flame-retardant additive. When the conductive polymer composition is burnt, the melamine cyanurate is decomposed by the heat of combustion, and oxygen is replaced with nitrogen gas. That is, the melamine cyanurate has an action of preventing combustion. Thus there is no fear of generation of halogen-caused toxic gases. That is, the belt pollutes environment very little.

The present inventors have also found that by using the anion-containing salt shown by the chemical formula 1 to impart electric conductivity to the seamless belt containing the polyester thermoplastic elastomer as its main component, it is easy to adjust the electric resistance thereof and possible to prevent fluctuation of the electric resistance inside the seamless belt and reduce the degree of dependence of its electric resistance on environment. Accordingly the seamless belt is manufactured by using the thermoplastic composition containing the polyester thermoplastic elastomer as its main component, the specified amount of the melamine cyanurate which is a nitrogen-containing flame-retardant additive, and the specified amount of the anion-containing salt, serving as its conductive agent, shown by the chemical formula 1.

Thereby the flame-retardant seamless belt of the present invention has superior fire retardance. Thus the flame-retardant seamless belt can be used in the image-forming apparatus at a high voltage and a high temperature and contributes to formation of a high-quality image. Further the electric resistance of the flame-retardant seamless belt can be easily adjusted. Furthermore inside the flame-retardant seamless belt, there is a slight variation in the electric resistance. Further it is possible to reduce the degree of dependence on environment in the electric resistance. When the flame-retardant seamless belt is used as an intermediate transfer belt, it provides preferable transfer performance for a long time without giving rise to a transfer deviation nor defective transfer. The flame-retardant seamless belt can be used as a transport belt, a developing belt, a fixing belt, and the base belt of a belt-shaped photosensitive member. These belts provide more favorable performance than conventional ones.

Favorably not less than 15 wt % not more than 40 wt % of the melamine cyanurate and more favorably not less than 20 wt % nor more than 35 wt % thereof is added to the entire weight of the flame-retardant seamless belt. If less than 15 wt % of the melamine cyanurate is added to the entire weight of the flame-retardant seamless belt, it is impossible to allow the flame-retardant seamless belt to be sufficiently flame-retardant. On the other hand, if more than 40 wt % of the melamine cyanurate is added to the entire weight of the flame-retardant seamless belt, the belt obtained by molding the thermoplastic composition is frail.

The flame-retardant seamless belt of the present invention has a volume resistivity not less than $1.0 \times 10^6 \Omega \cdot cm$ nor more than $1.0 \times 10^{12} \Omega \cdot cm$. It is favorable that the flame-retardant belt has the volume resistivity not less than $1.0 \times 10^6 \Omega \cdot cm$ nor more than $1.0 \times 10^{11} \Omega \cdot cm$. Thereby the flame-retardant seamless belt can be used widely as an intermediate transfer belt and a sheet-transporting belt. If the volume resistivity of the flame-retardant seamless belt is less than $1.0 \times 10^6 \Omega \cdot cm$, current flows readily, which makes it difficult to hold the electric charge. Consequently the flame-retardant seamless belt may not function as a member of the image-forming apparatus. On the other hand, if the volume resistivity of the flame-retardant seamless belt is more than $1.0 \times 10^{12} \Omega \cdot cm$, a high voltage is necessary for the process of transfer, charging, and toner supply. Further the transfer, charging, and toner supply operations are performed with low efficiency. Therefore the flame-retardant seamless belt is unsuitable for putting it into practical use.

To adjust the volume resistivity of the flame-retardant seamless belt to the range of $1.0 \times 10^6 \Omega \cdot cm$ to $1.0 \times 10^{12} \Omega \cdot cm$, the flame-retardant seamless belt should contain not less than 0.01 parts by weight nor more than three parts by weight and more favorably not less than 0.05 parts by weight nor more than 2.7 parts by weight of the anion-containing salt shown by the chemical formula 1 for 100 parts by weight of an entire polymer component.

The addition of even a slight amount of the anion-containing salt shown by the chemical formula 1 has the effect of reducing the resistance value of the flame-retardant seamless belt. If the flame-retardant seamless belt contains less than 0.01 parts by weight of the anion-containing salt, it is difficult to adjust the resistance value thereof. If the flame-retardant seamless belt contains more than three parts by weight of the anion-containing salt, the effect of reducing the electric resistance thereof can be hardly obtained, i.e., the electric resistance thereof cannot be reduced further, an electric field is applied thereto during its use, and the salt oozes out owing to contact between the belt and an OPC. Further in extruding the conductive polymer composition to form the belt, the conductive polymer composition is liable to adhere to the lip of a die and a sizing die. Thereby it is difficult to mold the conductive polymer composition. It is preferable that the anion-containing salt shown by the chemical 1 is dispersed uniformly in the thermoplastic composition and thus in the belt.

The flame-retardant seamless belt contains the polyester thermoplastic elastomer as its main component. Thereby the flame-retardant belt has a proper degree of elasticity, flexibility, and hardness. Further the flame-retardant seamless belt is resistant to repeated flexing, i.e., it has a high degree of durability. The polyester thermoplastic elastomer is resistant to shock, heat, and oil and can be molded favorably. Therefore the flame-retardant seamless belt is hardly modified by toner or the like and hardly stains the photosensitive member. The polyester thermoplastic elastomer has excellent colorability. Thus in combination with the action of the melamine cyanurate serving as an extender pigment, it is possible to obtain a white belt or a belt in other colors. The addition of a lubricant improves moldability to a higher extent. That is, the flame-retardant seamless belt has a proper degree of flexibility in its thickness direction, hardly elongates longitudinally, and is resistant to vibrations. The conductive polymer composition contains favorably not less than 60 wt % and more favorably not less than 65 wt % of the polyester thermoplastic elastomer for the entire polymer component.

The anion-containing salt shown by the chemical formula 1 is stabilized as anions by the electron attraction property of the fluoro group and the sulfonyl group of the functional group of $X_1$ and $X_2$ of the chemical formula 1. Thus the anions show a high dissociation degree. Thereby the conductive polymer composition is capable of obtaining a very low electric resistance by adding a small amount of the anion-containing salt to the entire polymer component. The anion-containing salt is chemically and electrochemically stable for electrodes or the like and is safe. Further the anion-containing salt can be used in a wide range of temperature, allows the electric resistance of the belt to be adjusted easily, and allows the electric resistance inside the belt to have slight variations. In particular, the anion-containing salt can be readily captured into a polyether segment. Therefore the electric resistance of the belt is dependent on environment to a low extent and hardly stains the OPC. Furthermore the anion-containing salt is inexpensive and easily commercially available. The anion-containing salt is powdery at the room temperature and can be kneaded easily. The anion-containing salt allows the thermoplastic composition to have a smooth extruded surface. Particularly the anion-containing salt allows a polymer of polyether polyester to have a smooth extruded surface.

In the salt shown by the chemical formula 1, $X_1$ and $X_2$ are functional groups which contain all of C, —F, and —$SO_2$— and have one to eight carbon atoms. In terms of stability, cost, and handling properties, it is preferable that $X_1$— of the chemical formula 1 is $C_{n1}H_{m1}F_{(2n1-m1+1)}$—$SO_2$— and that $X_2$— of the chemical formula 1 is $C_{n2}H_{m2}F_{(2n2-m2+1)}$—$SO_2$— (n1 and n2 are integers not less than 1, and m1 and m2 are integers not less than 0).

It is preferable that the cation, making a pair with the anion shown by the chemical formula 1, which constitutes the salt is the cation of any one of the alkali metals, the group 2A metals, the transition metals, and the amphoteric metals. Lithium is preferable as the metal which constitutes the cation, because lithium has a high conductivity. The alkali metals are more favorable than the other metals, because the alkali metals have small ionization energy and thus form stable cations readily. In addition to the cations of the metals, salts shown by the chemical formulas 2 and 3 are preferable. In the formulas 2 and 3, the reference symbols $R_1$ through $R_6$ show alkyl group having 1 to 20 carbon atoms or its derivatives. $R_1$ through $R_4$ may be identical to or different from each other. Similarly, $R_5$ and $R_6$ may be identical to or different from each other. It is particularly preferable to use a salt containing trimethyl-type quaternary ammonium cations consisting of three methyl groups of $R_1$ through $R_4$ and one alkyl group or its derivative having favorably 7 to 20 carbon atoms. This is because three methyl groups, having strong electron-donating property, of the salt is capable of stabilizing the positive electric charge of nitrogen atoms. In addition, the alkyl group or its derivative is capable of improving compatibility of the salt with the ionic-conductive elastomer component. In the cation shown by the chemical formula 3, $R_5$ or $R_6$ having a stronger electron-donating property is capable of stabilizing the positive electric charge of nitrogen atoms and allowing the cation to be stable to a higher extent, thus allowing the salt to have a higher dissociation degree and superior conductivity-imparting performance.

Chemical formula 2

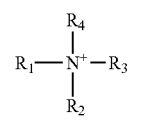

Chemical formula 3

Of the anion-containing salts shown in the chemical formula 1, lithium-bis (trifluoromethanesulfonyl) imide (($CF_3SO_2)_2NLi$) is very favorable, because its melting point is 228° C. which falls in the range of a kneading temperature and a belt-processing temperature (200° C. to 240° C.) and can be captured easily into a polyether segment. In addition, the following salts may be used singly or in combination: $(C_2F_5SO_2)_2NLi$, $(C_4F_9SO_2)$ $(CF_3SO_2)NLi$, $(FSO_2C_6F_4)$ $(CF_3SO_2)NLi$, $(C_8F_{17}SO_2)$ $(CF_3SO_2)NLi$, $(CF_3CH_2OSO_2)_2NLi$, $(CF_3CF_2CH_2OSO_2)_2NLi$, $(HCF_2CF_2CH_2OSO_2)_2NLi$, $((CF_3)_2CHOSO_2)_2NLi$, and the like.

It is preferable that the anion-containing salt shown by the chemical formula 1 is added to the polymer component without the intermediary of a medium selected from among the group of a low-molecular-weight polyether compound or a low-molecular-weight polar compound whose molecular weight is not more than 10000. When the medium is used successively for a long time, the electric resistance rises of the flame-retardant seamless belt greatly. Further the medium separates out with ions and is liable to stain the photosensitive member. Known methods can be used to add the anion-containing salt shown by the chemical formula 1 to the polymer component without the intermediary of the above-described medium. For example, after dry blend is performed with a Henshell mixer, a tumbler or the like, mixing of a mixture of the anion-containing salt shown by the chemical formula 1 and the polymer component is carried out by fusion with a mono-axial extruder, a biaxial extruder, a Banbury mixer or a kneader. The anion-containing salt shown by the chemical formula 1 can be added to the polyester thermoplastic elastomer at a high temperature in an atmosphere of an inactive gas such as nitrogen to prevent deterioration of the polymer.

It is preferable that supposing that a volume resistivity of the flame-retardant seamless belt measured at a low temperature of 10° C. and a low humidity of 15% is $R_{LL}$ and that a volume resistivity thereof measured at a high temperature of 32.5° C. and a high humidity of 90% is $R_{HH}$, the volume resistivity $R_{LL}$ and the volume resistivity $R_{HH}$ satisfy the following equation: $\log_{10} R_{LL} - \log_{10} R_{HH} \leq 2.5$. It is preferable that the difference between the value of common logarithm of a maximum value of volume resistivities (Ω·cm) inside the belt and the value of common logarithm of a minimum value thereof is not more than 0.5.

The flame-retardant seamless belt may have at least one coating layer on the peripheral surface thereof. In the case where the flame-retardant seamless belt is used as an intermediate transfer belt for an image-forming apparatus, to easily scrape toner which has left thereon, change the degree of adhesiveness to the intermediate transfer belt and the degree of removability of toner therefrom, and control the surface energy, it is possible to apply a known material containing a base polymer consisting of urethane, acrylic, rubber latex or the like and fluorocarbon resin dispersed therein to the surface of the intermediate transfer belt by using a known method such as electrostatic deposition, spray coating, dipping, brushing, and the like. The thickness of the coating layer is preferably 1 μm to 20 μm. Thereby the intermediate transfer belt has a higher function. The coating layer may consist of two or three layers and can be disposed on the peripheral or/and inner peripheral surface of the intermediate transfer belt. It is possible to appropriately alter components of each layer, adjust the layering order, and adjust the thickness of each layer in dependence on demanded performance.

It is preferable to set the thickness of the extruded seamless belt to 50 μm to 500 μm. The thickness of the seamless belt can be variably set in an extruding operation by appropriately adjusting the gap of a die lip, the delivery of the thermoplastic composition, and the take-off speed of the seamless belt.

If the thickness of the seamless belt is less than 50 μm, it is apt to expand. Consequently, supposing that the seamless belt is used for an image-forming apparatus to form an image by superimposing toner in different colors, deviations are liable to occur. On the other hand, if the thickness of the seamless belt is more than 500 μm, it has a high flexural rigidity, which makes it difficult to suspend it on its driving shaft. The surface roughness Rz of the seamless belt is favorably not more than 2.0 μm and more favorably not more than 1.8 μm to enhance transfer efficiency, transporting performance, and toner-cleaning performance.

The melamine cyanurate acts as an extender pigment as well and thus makes the seamless belt to be colored easily. It is possible to obtain a white belt by adding the melamine cyanurate to the polymer component. It is preferable to use the white belt as an intermediate transfer belt, because toner which has attached thereto can be easily detected with the naked eye. Thus the white belt is favorable for evaluating cleaning performance. It is preferable not to add additives such as carbon black making the seamless belt black.

The thermoplastic composition may contain phosphate ester whose melting point is not less than 80° C. in such a way that phosphorous thereof is not less than 0.1 wt % nor more than 0.4 wt % for the entire weight. By using the melamine cyanurate and the phosphate ester in combination, the seamless belt is allowed to have higher fire retardance without increasing the amount of the melamine cyanurate, have a high strength, and have a short after-flame time.

The polyester thermoplastic elastomer having a suitable grade in its hardness, modulus of elasticity, and moldability can be used in dependence on the characteristic demanded for the seamless belt. For example, a polyester polyether thermoplastic elastomer, a polyester polyester thermoplastic elastomer, and the like can be used singly or in combination.

The anion-containing salt is captured in such a way that cations thereof are captured in the vicinity of the ether linkage of polyether or the ester linkage of polyester. Therefore the salt hardly oozes out of the system. Thus a preferable electric conductivity can be displayed. In the polyether polyester thermoplastic elastomer, the molecular chain which is a soft segment has slight variations in its modulus of elasticity between the state of a low temperature and humidity and the state of a high temperature and humidity. Therefore the polyether polyester thermoplastic elastomer allows the electric resistance of the seamless belt to be dependent on environment to a low extent.

It is preferable that the polyester thermoplastic elastomer is a copolymer of a hard segment consisting of polyester having the aromatic ring and a low-melting point soft segment consisting of polyether and/or polyester. It is preferable that the polyester thermoplastic elastomer has a melting point of not less than 150° C. when it is formed of a high polymeric substance consisting of a high-melting point polyester segment component. It is preferable that the polyester thermoplastic elastomer has a melting point or a softening point at not more than 80° C. when it is formed of a high polymeric substance consisting of a low-melting point soft segment component.

As the component composing the high-melting point polyester segment having the aromatic ring, it is possible to use aromatic dicarboxylic acid such as terephthalic acid, isophthalic acid, diphenyl dicarboxylic acid, 2,6-naphthalene dicarboxylic acid; esters of the aromatic dicarboxylic acid; glycol whose number of carbon atoms is one to 25; and ester-forming derivatives of the glycol. It is preferable that the terephthalic acid is contained at not less than 70 mol % of the entire acidic constituent of the component composing the high-melting point polyester segment. As the glycol whose number of carbon atoms is one to 25, ethylene glycol, 1,4-butanediol, and ester-forming derivatives of the ethylene glycol and 1,4-butanediol can be listed. Other acidic constituents can be used as necessary, provided that mol % thereof is favorably not more than 30 and more favorably not more than 25.

As the low-melting point soft segment, of the present invention, consisting of polyether, polyalkyleneether glycol such as poly (ethylene oxide) glycol and poly (tetramethylene oxide) glycol can be listed. The poly (tetramethylene oxide) glycol is favorable in consideration of its high melting point and moldability. It is particularly preferable that its molecular weight is 800 to 1500 in terms of its low-temperature characteristic. It is favorable that 15% to 75% of the poly (tetramethylene oxide) glycol is contained for the whole weight of the polyester thermoplastic elastomer.

It is preferable to use lactones as the low-melting point soft segment, of the present invention, consisting of polyester. Caprolacton is most favorable as the lactones. In addition, enanlacton and caprylolacton can be used as the lactones. These lactones can be used singly or in combination. The copolymerization ratio of the aromatic polyester and the lactones are selected according to use. The standard weight ratio between the aromatic polyester and the lactones is set to 97/3 to 5/95 and preferably 95/5 to 30/70.

As the thermoplastic composition, polymer components such as thermoplastic elastomer, a thermoplastic resin, and the like can be used singly or in combination as necessary in addition to the polyester thermoplastic elastomer.

To improve the mechanical strength of the seamless belt, fillers may be used. As the fillers, it is possible to use calcium carbonate, silica, clay, talc, barium sulfate, and diatomaceous earth. It is possible to use fatty acids such as stearic acid, lauric acid, and the like; and softeners such as cottonseed oil, tall oil, asphalt substances, paraffin wax, and the like, provided that the addition of these fatty acids and the softeners does not cause liberation of additives from the surface of the seamless belt, bleeding, blooming, and shifting of the additives to the photosensitive member and the like and stain thereof nor adversely affect fire retardance and conductivity of the seamless belt. Thereby it is possible to adjust the hardness and flexibility of the seamless belt appropriately. Age resistors such as imidazolyls, amines, and phenols may be added to the polymer component.

The present invention provides a method of manufacturing a flame-retardant seamless belt comprising the steps of:

fusing and kneading, by an extruder, a conductive master batch containing a polyester thermoplastic elastomer and not less than one wt % nor more than 20 wt % of an anion-containing salt, shown below by a chemical formula 1, added to the polyester thermoplastic elastomer; a flame-retardant additive; and a thermoplastic composition containing the polyester thermoplastic elastomer as a main component thereof to form a material for the flame-retardant seamless belt; and extruding the material from an annular die and molding the material into a shape of a belt by using a sizing die.

Chemical Formula 1

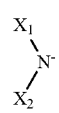

where $X_1$ and $X_2$ denote functional group, containing C, —F, and —$SO_2$—, whose number of carbon atoms is one to eight.

As a result of their energetic studies, the present inventors have found that by kneading the anion-containing salt shown by the chemical formula 1 into the polymer such as the polyester thermoplastic elastomer to obtain the conductive master batch, the anion-containing salt can be dispersed uniformly in the polymer. In the case where the addition amount of the anion-containing salt to the thermoplastic composition is small, the electric resistance can be adjusted easily. By kneading the conductive master batch, the flame-retardant additive, and the thermoplastic composition and extruding the mixture, the anion-containing salt is dispersed uniformly in the thermoplastic composition. Thereby it is easy to obtain the flame-retardant seamless belt having slight variations in its electric resistance and a proper degree of elasticity and fire retardance.

If the conductive master batch contains less than one wt % of the anion-containing salt shown by the chemical formula 1, it is difficult to obtain the effect of forming the conductive master batch. On the other hand, if the conductive master batch contains more than 20 wt %, it is difficult to accomplish the kneading of the salt into the polyester thermoplastic elastomer. The kneading can be performed by using a Banbury mixer, a kneader or the like. It is preferable to draw a strand with a biaxial extruder.

It is preferable that the flame-retardant additive and thermoplastic composition containing the polyester thermoplastic elastomer as its main component are kneaded and supplied to the extruder as the flame-retardant master batch and that the mixture is extruded vertically from the annular die.

The thermoplastic composition fused by the extruder is introduced into the annular die and extruded from a die lip. Then the fused thermoplastic composition is supplied to the sizing die disposed at the downstream side of the die lip to cool and harden it, with the thermoplastic composition in contact with the sizing die. Thereby the thermoplastic composition can be belt-shaped. Then the continuous cylindrical thermoplastic composition is cut by a cutting apparatus disposed at the downstream side of the sizing die. Thereby a belt having predetermined width is obtained. It is preferable that the fusing temperature at the extruder is 200° C. to 250° C. More specifically, the conductive master batch, the flame-retardant master batch, and the polyester thermoplastic elastomer are dry-blended and kneaded by a biaxial extruder to obtain a material for the belt. There after the strand is drawn to pelletize the material. The pellet is dried. The pellet is supplied to a hopper of a mono-axial extruder. By extruding it in this manner, it is easy to obtain a belt which is as thin as 250 μm and has a large diameter of ø 168 mm and a width of 400 mm.

The fused thermoplastic composition is extruded vertically from the die lip. Thus it is not affected by gravity, and residual strain is reduced, and the fused thermoplastic composition is introduced into the sizing die, with the fused thermoplastic composition keeping the cylindrical state. Thereby the obtained belt has a high dimensional accuracy. It is preferable that the extrusion direction is vertical.

The dispersibility of the flame-retardant additive such as the melamine cyanurate can be improved by kneading it into the polymer such as the polyester thermoplastic elastomer to form the flame-retardant master batch. Thereby the flame-retardant additive contained in the flame-retardant master batch does not form a granular structure owing to aggregation of the flame-retardant additive during an operation of molding the material into a belt. The generation of the granular structure can be prevented without using the flame-retardant master batch when kneading is performed effectively. However, the method of using the master batch can be carried out easily. The flame-retardant master batch contains the flame-retardant additive favorably at 30 wt % to 70 wt % and more favorably at 40 wt % to 60 wt %.

The components can be mixed with one another with a mono-axial extruder, a biaxial extruder, an enclosed mixer, an open roll or a kneader. However, the biaxial extruder is most favorable because it kneads them efficiently. In addition to the extrusion, injection molding may be adopted.

The present invention provides an image-forming apparatus having the flame-retardant seamless belt of the present invention. As described above, the flame-retardant seamless belt of the present invention has slight variations in its electric resistance and reduces the degree of dependence on environment in its electric resistance. Therefore the image-forming apparatus such as a copying apparatus, a facsimile, a printer, and the like provides a uniform image. Further since the electric resistance depends on environment to a slight extent, it is unnecessary to use a large power unit to cover the variation of the electric resistance. Thus the image-forming apparatus consumes a small electric power. In addition, it is possible to simplify the construction of the control system thereof. Furthermore it is possible to reduce the number of operation tests in different environment and hence reduce the period of time and the cost required for development.

DETAILED DESCRIPTION OF THE PREFERRED EMBODIMENTS

The embodiments of the present invention will be described below with reference to the drawings.

Figure 1:
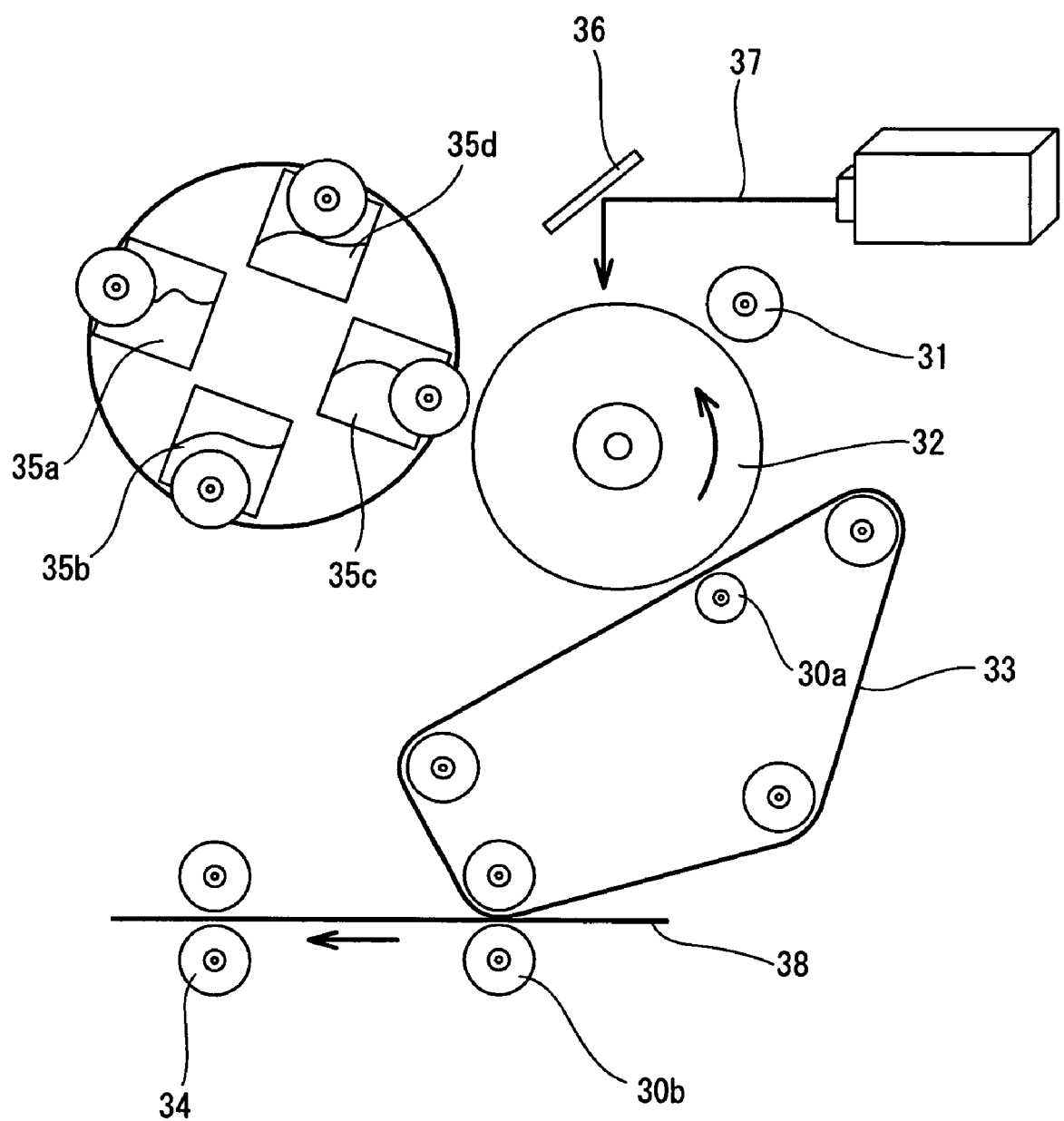
FIG. 1 is an illustrative front view showing a color image-forming apparatus having a flame-retardant seamless belt of the present invention.

FIG. 1 shows a mode in which the flame-retardant seamless belt of the first embodiment of the present invention is used as an intermediate transfer belt 33.

FIG. 1 shows an image-forming apparatus, namely, a color printer having the flame-retardant seamless belt of the present invention used as an intermediate transfer belt 33. The color printer has transfer rollers 30A and 30B, a charging roller 31, a photosensitive member 32, an intermediate transfer belt 33, a fixing roller 34, toner 35 in four colors (35A, 35B, 35C, and 35D), and a mirror 36.

In forming an image by the color image-forming apparatus, initially, the photosensitive member 32 rotates in the direction shown with the arrow of FIG. 9. After the photosensitive member 32 is charged by the charging roller 31, a laser 37 exposes a non-imaging portion of the photosensitive member 32 via the mirror 36. As a result, the non-imaging portion is destaticized. The portion of the photosensitive member 32 corresponding to an imaging portion is charged. Thereafter the toner 35A is supplied to the photosensitive member 32 and attaches to the charged imaging portion to form a first-color toner image. An electric field is applied to the primary transfer roller 30A to transfer the toner image to the intermediate transfer belt 33. In the same manner, a toner image of each of the other toners 35B to 35D formed on the photosensitive member 32 is transferred to the intermediate transfer belt 33. A full-color image composed of toner 35 (35A through 35D) in four colors is formed on the intermediate transfer belt 33. An electric field is applied to the secondary transfer roller 30B to transfer the full-color image to a to-be-transferred material (normally, paper) 38. When the to-be-transferred material 38 passes between a pair of the fixing rollers 34 heated to a predetermined temperature, the full-color image is transferred to the surface thereof. In performing double-side printing, the paper 38 or the like that has passed the fixing roller 34 is inverted inside the printer. Then the above-described image-forming processes are repeated. Thereby an image is formed on the rear surface of the paper 38.

The thermoplastic composition composing the flame-retardant seamless belt of the present invention used as the intermediate transfer belt 33 contains a polyester thermoplastic elastomer as its main component, 25 wt % of melamine cyanurate for the whole weight of the thermoplastic composition, 0.5 parts by weight of lithium-bis (trifluoromethanesulfonyl) imide which is the anion-containing salt, shown by the chemical formula 1, added to 100 parts by weight of the entire polymer component. The thermoplastic composition has a volume resistivity of $10^{8.7} \Omega \cdot cm$. After the thermoplastic composition is kneaded by using a biaxial extruder, it is extruded into the shape of a belt. Supposing that a volume resistivity of the flame-retardant seamless belt measured at a low temperature of 10° C. and a low humidity of 15% is $R_{LL}$ and that a volume resistivity thereof measured at a high temperature of 32.5° C. and a high humidity of 90% is $R_{HH}$, the volume resistivity $R_{LL}$ and the volume resistivity $R_{HH}$ satisfy an equation of $\log_{10} R_{LL} - \log_{10} R_{HH} = 2.0$. Lithium-bis (trifluoromethanesulfonyl) imide is added to the entire polymer component without the intermediary of a medium consisting of a low-molecular-weight polyether compound or a low-molecular-weight polar compound whose molecular weight is not more than 10000.

The intermediate transfer belt 33 of the present invention has excellent fire retardance and does not stain the photosensitive member. Further the intermediate transfer belt 33 has a proper degree of flexibility in its thickness direction and extends very little longitudinally. In addition, it pollutes environment very little. Thus it can be suitably put to practical use reliably. Further fire retardance is imparted to the flame-retardant seamless belt without adversely affecting the volume resistivity thereof. Furthermore the flame-retardant seamless belt has a low degree of in-plane variation in its electric resistance, has a low degree of dependence on environment in its electric resistance. In addition, the flame-retardant seamless belt has a smooth extruded surface. Accordingly the flame-retardant seamless belt of the present invention can be used for the image-forming apparatus such as a copying apparatus, a facsimile, a printer, and the like without restriction in the use state, even if the flame-retardant seamless belt is used in environment having a high voltage and a high temperature.

The method of producing the flame-retardant seamless belt of the present invention is described in detail below.

Initially, a conductive master batch containing the polyester thermoplastic elastomer as its main component and 10 wt % of the anion-containing salt shown by the chemical formula 1 is prepared. Then a flame-retardant master batch containing the polyester thermoplastic elastomer and the melamine cyanurate whose amount is equal to that of the polyester thermoplastic elastomer is prepared. The conductive master batch, the flame-retardant master batch, and the polyester thermoplastic elastomer are supplied to the biaxial extruder and kneaded to obtain a material consisting of the thermoplastic composition to be molded into the flame-retardant seamless belt.

The conductive master batch should be kneaded at 200° C. to 250° C. The kneading time period is favorably 1 to 20 minutes. The flame-retardant master batch should be kneaded at 200° C. to 250° C. The kneading time period is favorably 1 to 20 minutes.

Figure 2:
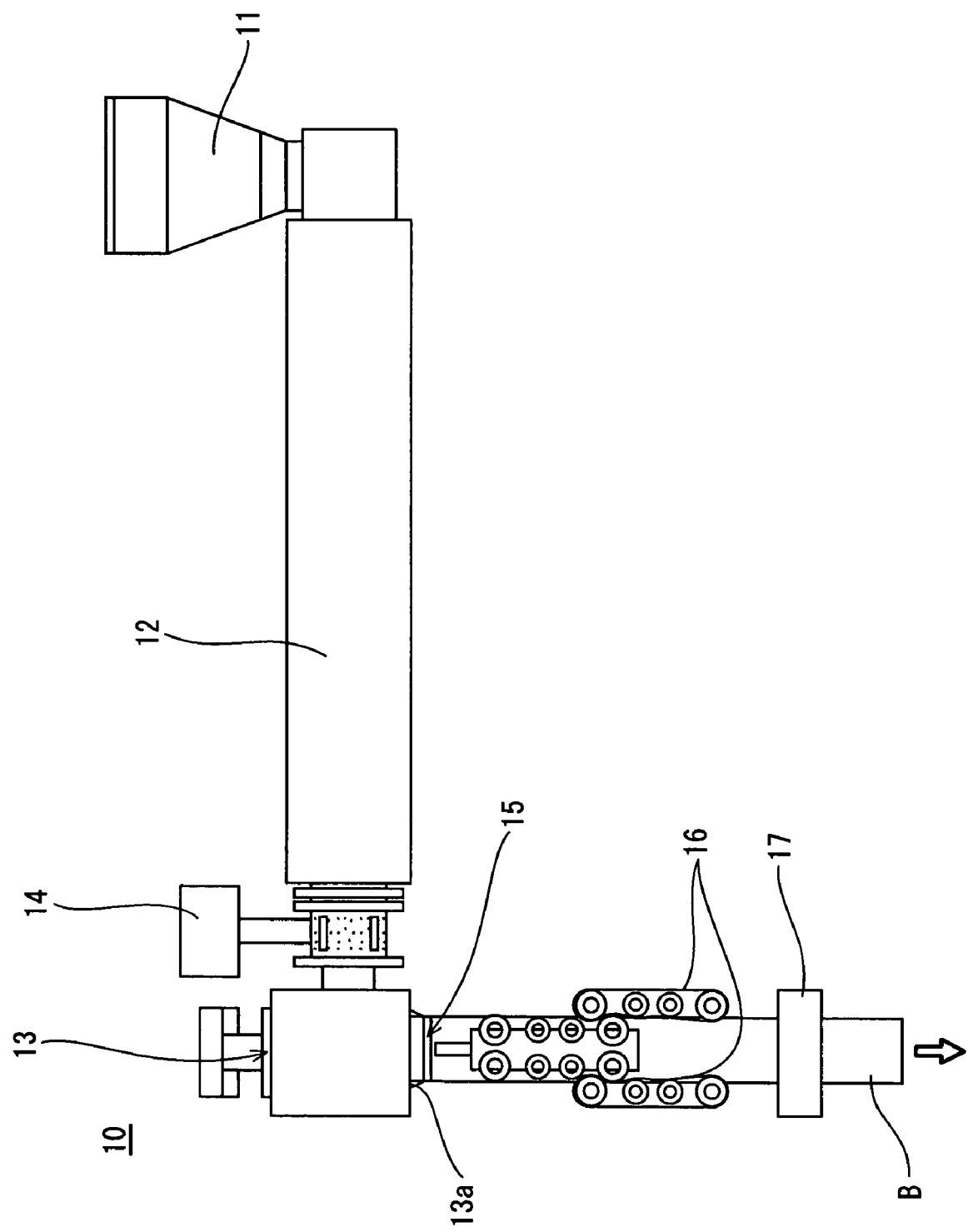
FIG. 2 is schematic view showing an apparatus for manufacturing the flame-retardant seamless belt.

FIG. 2 shows a belt-manufacturing apparatus 10. The belt-manufacturing apparatus 10 has a hopper 11 to which a material is supplied; an extrusion unit 12 for extruding the supplied material in a fused state; a cross head die 13, having an annular construction, whose axis is perpendicular to the axis of the extrusion unit 12; a gear pump 14, disposed between the extruder 12 and the cross head die 13, for adjusting the extrusion amount; an inside sizing unit 15 for shaping an extruded annular material B in the direction from the inner peripheral side thereof; a take-off unit 16 for vertically taking off the shaped annular material B; and an automatic cutting unit 17 for cutting the annular material B continuously shaped to a predetermined length. The cross head die 13 extrudes the fused material vertically downward from a die lip 13a thereof.

The material for the belt is supplied to the hopper 11 of the extruder 12 and fused at 200° C. to 250° C. The fused material is fed to the cross head die 13, with the gear pump 14 adjusting the extrusion amount of the material. The fused material is extruded annularly and vertically downward from the die lip 13a of the annular cross head die 13 at an extrusion speed of 133 mL/minute. The annular material B extruded from the die lip 13a is fed downward along the inside sizing unit 15, with the annular material B being cooled to 70° C. to 100° C. to form it into the shape of a belt. The belt-shaped material is fed vertically downward and received by the take-off unit 16. Then the automatic cutting unit 17 cuts the belt-shaped material to a predetermined length. In this manner, the flame-retardant seamless belt is produced.

Although the flame-retardant seamless belt of the first embodiment is used as the intermediate transfer belt, it can be used as a fixing belt, a developing belt, and a transport belt for use in the image-forming apparatus. It is preferable to color the intermediate transfer belt in white, because if toner attaches thereto, it can be easily detected. Thus the white belt is favorable for evaluating cleaning performance. Therefore the white flame-retardant seamless belt can be suitably used as the intermediate transfer belt.

The seamless belt of the first embodiment has only one layer composed of the thermoplastic composition. However, the seamless belt may have at least one coating layer on the peripheral surface on the one layer. The coating layer may consist of two or three layers and can be disposed on the peripheral or/and inner peripheral surface of the seamless belt.

As the polyester thermoplastic elastomer, polyester polyether or polyether polyester can be used. The anion-containing salt is not limited to the above-described salts, provided that the anion-containing salt has the anion shown by the chemical formula 1. The kind of the cation may be altered. In addition to the extrusion, injection molding may be adopted. Further the material can be molded without using the master batch.

The examples of the flame-retardant seamless belt of the present invention and the comparison examples are described in detail below.

EXAMPLE 1

10 wt % of lithium-bis (trifluoromethanesulfonyl) imide which is the anion-containing salt shown by the chemical formula 1 was dry-blended with a polyester thermoplastic elastomer ("Pelprene P90BD" produced by Toyobo Co., Ltd.: polyester polyether). The mixture was supplied to a hopper of a biaxial extruder to knead it at 210° C. Thereby a conductive master batch was obtained. The temperature of the resin measured at this time was 230° C.

50 wt % of melamine cyanurate ("MC640" produced by Nissan Chemical Industries, Ltd.) was dry-blended with the "Pelprene P90BD". The mixture was supplied to the hopper of the biaxial extruder to knead it at 210° C. Thereby a flame-retardant master batch was obtained. The temperature of the resin measured at this time was 230° C.

A pellet of each of the "Pelprene P90BD", the conductive master batch, and the flame-retardant master batch were dry-blended in such a way that the weight ratio of the lithium-bis (trifluoromethanesulfonyl) imide was 0.5 parts by weight for 100 parts by weight of the "Pelprene P90BD" and that the weight ratio of the melamine cyanurate was 25 parts by weight for the entire weight of the mixture. The mixture was supplied to the hopper of the biaxial extruder to knead it at 210° C. Thereby the material to be molded into the flame-retardant seamless belt was obtained. The temperature of the resin measured at this time was 230° C.

The material for the belt was supplied to the hopper of the extruder of the belt-manufacturing apparatus shown in FIG. 2. The extruder was operated to fuse the material. The fused material was extruded vertically downward from the annular die having a temperature of 235° C. The annular die has an inner diameter of 185 mm and a gap of 0.5 mm. The fused material was fed along the inside sizing unit having an outer diameter of 170 mm to cool it at 80° C. As a result, the material set. Then the material was drawn vertically downward at a take-off speed of 1 m/minute. Then the material was cut by the automatic cutting unit. As a result, the material had a width of 400 mm. In this manner, the flame-retardant seamless belt was successively obtained. The belt had an inner diameter of 169.5 mm, an average thickness of 250 μm, and a width of 400 mm.

The performance of the belt of the example 1 is shown below. The following performances thereof were measured by methods that will be described later:

Volume resistivity: $10^{8.7}$ (Ω·cm)

In-plane variation: 0.4

Degree of dependence on environment: 2.0

Surface roughness: Rz=1.6 μm

Printing: favorable

Fire retardance: ○

Measurement of Volume Specific Resistance (Volume Resistivity)

The volume specific resistance of the belt was measured at a constant temperature of 23° C. and a constant relative humidity of 55% by using an ultra-high resistance microammeter R-8340 manufactured by Advantest Corporation Inc. The measurement was conducted in accordance with the method of measuring the volume resistivity (volume specific resistance) specified in JIS K 6911. The voltage applied to the belt was 500V.

In-plane Variation of Resistance Value

The volume resistivity (Ω·cm) at 30 points inside the belt was measured. The value of common logarithm of a maximum value of volume resistivities (Ω·cm) at 30 points—the value of common logarithm of a minimum value thereof=in-plane variation (measurement environment: 23° C.×55%, measurement method: "Highresta, URS probe, 10s, 250V). The value of the in-plane variation is preferably not more than 0.5.

Measurement of Degree of Dependence of Resistance Value on Environment

The degree of dependence of volume resistivity (Ω·cm) on environment was evaluated by the difference between the value of common logarithm of the volume resistivity (Ω·cm) in a condition LL (10° C., relative humidity: 15%) and the value of common logarithm of the volume resistivity (Ω·cm) in a condition HH (32.5° C., relative humidity: 90%). The value indicating the degree of dependence of the volume resistivity (Ω·cm) on environment is favorably not more than 2.5.

Surface Roughness

Based on JIS B0601, the surface roughness Rz of the belt was measured. As the measurement conditions, cut-off value: 0.25 mm, measurement length: 2.0 mm, and a measurement speed: 0.3 mm/s.

Printing

The belt was mounted on a full-color electrophotographic apparatus (produced by Seiko Epson Corporation, "Intercolor LP-8300C) as an intermediate transfer belt thereof to conduct a printing test. Thereby transfer performance of the belt was evaluated.

Fire Retardance

Fire retardance test: VTM2

UL-94: Conformed to a burning test of a plastic material.

A fire retardance test was conducted on a thin film sample in accordance with a method "vertical firing test of thin material: VTM-0, VTM-1, VTM-2". If the belt attained the level of VTM-2, a mark of ○ was given thereto, whereas if the belt did not attain the level of VTM-2, a mark of × was given thereto.

EXAMPLE 2

A conductive master batch and a flame-retardant master batch were prepared in a manner similar to that of the example 1. Except that weight ratio of the lithium-bis (trifluoromethanesulfonyl) imide was 2.5 parts by weight for 100 parts by weight of the "Pelprene P90BD", the components were kneaded in conditions similar to that of the example 1 to obtain a flame-retardant seamless belt. The flame-retardant seamless belt had an inner diameter, an average thickness, and a width equal to those of the flame-retardant seamless belt of the example 1.
Volume resistivity: $10^{7.2}$(Ω·cm)
In-plane variation: 0.4
Degree of dependence on environment: 2.4
Surface roughness: Rz=1.1 μm
Printing: favorable
Fire retardance: ○

EXAMPLE 3

Water-soluble urethane resin ("Bayerhijoule TPLS2186" produced by Sumitomo Bayer Urethane Corporation) was diluted with water. A leveling agent was added to the solution to form a paint-like material. The paint-like material was electrostatically deposited to form a coating layer on the peripheral surface of the belt of the example 1 by an electrostatic deposition apparatus. The thickness of the coating layer was 5 μm.
Volume resistivity: $10^{9.4}$(Ω·cm)
In-plane variation: 0.4
Degree of dependence on environment: 1.6
Surface roughness: Rz=1.6 μm
Printing: favorable Owing to the effect of the formation of the coating layer, the toner transfer efficiency was improved in the printing test. Thus a small amount of toner was left in the toner transfer. The cleaning blade scraped residual toner at a high efficiency.
Fire retardance: ○

COMPARISON EXAMPLE 1

Except that the "Pelprene P90BD", carbon black, and the flame-retardant master batch of the example 1 were dry-blended in such a way that the ratio of the carbon black was 15 parts by weight for 100 parts by weight the "Pelprene P90BD" and the ratio of the melamine cyanurate was 25 wt % for the whole weight of the mixture, the components were kneaded in a condition similar to that of the example 1 to obtain a flame-retardant seamless belt. The sizes of the flame-retardant seamless belt were also equal to those of the flame-retardant seamless belt of the example 1.
Volume resistivity:
The resistance value was partly low. There were large variations in the resistance value. Thus the resistance value could not be measured in a region and was $10^{12}$(Ω·cm) in other region. In-plane variation: Similarly to the volume resistivity, the electric resistance could not be measured because there were large variations in the resistance value.
Degree of dependence on environment: Similarly to the volume resistivity, the electric resistance could not be measured because there were large variations in the resistance value.
Surface roughness: A granular structure was generated partly owing to generation of aggregation of the carbon lack
Printing: impossible
Fire retardance: ○

COMPARISON EXAMPLE 2

Except that the weight ratio between the "Pelprene P90BD" and the melamine cyanurate was 75:25, the components were kneaded with one another with the biaxial extruder in a condition similar to that of the example 1 to obtain a flame-retardant seamless belt.
Volume resistivity: $10^{12.4}$(Ω·cm)
In-plane variation: 0.4
Degree of dependence on environment: 1.4
Surface roughness: Rz=1.8 μm
Printing: Because the resistance value was large, a high voltage was required in the transfer time. Thus the belt cannot be put into practical use.
Fire retardance: ○

COMPARISON EXAMPLE 3

Except that the content of the lithium-(trifluoromethanesulfonyl) imide was 4.0 parts by weight for 100 parts by weight of the "Pelprene P90BD", the components were kneaded with one another in a condition similar to that of the example 1 to obtain a material to be molded into the belt. Although extrusion was performed in a manner similar to that of the example 1, the fused material extruded from the annular die adhered to the inside sizing die. Thus the material could be molded into the shape of a belt.

As described above, the belt of each of the examples 1 through 3 was evaluated as excellent. That is, it was confirmed that the flame-retardant seamless belt can be reliably put into practical use. On the other hand, since the material for the belt of the comparison example 1 contained the carbon black, the belt had large variations in its electric resistance. The volume resistivity of the material for the belt of the comparison example 2 was so large that it cannot be put into practical use for an image-forming apparatus. The material for the belt of the comparison example 3 contained the salt too much. Thus the material could not be extruded.

As apparent from the foregoing description, according to the present invention, the seamless belt is manufactured by using the thermoplastic composition containing the polyester thermoplastic elastomer as its main component, the specified amount of the melamine cyanurate serving as a flame-retardant additive, and the specified amount of the anion-containing salt, serving as the conductive agent, shown by the chemical formula 1. Therefore it is possible to provide the belt having superior fire retardance imparted thereto without adversely affecting its electric conductivity and having a small in-plane variation in its electric resistance and a low degree of dependence on environment in its electric resistance. Further the belt has a smooth extruded surface, does not stain an OPC, and has a proper degree of elasticity, which makes its driving performance and durability superior.

The seamless belt of the present invention has superior fire retardance. Thus the belt can be suitably used inside an image-forming apparatus in various condition, for example, at a high voltage and a high temperature. The melamine cyanurate does not bleed or bloom on the surface of the belt in a temperature range in which the image-forming apparatus is used and thus does not stain the photosensitive member. The melamine cyanurate is a nitrogen-containing flame-retardant additive. Thus there is no fear of generation of halogen-caused toxic gases. That is, the belt pollutes environment very little.

The melamine cyanurate acts as an extender pigment as well and thus makes the seamless belt to be colored easily. It is possible to obtain a white belt by adjusting an additive or the like. Thus the flame-retardant seamless belt can be suitably used as an intermediate transfer belt.

Therefore when the flame-retardant seamless belt of the present invention is used as a transfer belt or an intermediate transfer belt, they provide preferable transfer performance for a long time without giving rise to a transfer deviation nor defective transfer. Further the flame-retardant seamless belt can be used as a transport belt, a developing belt, a fixing belt, and the base belt of a belt-shaped photosensitive member.

According to the method of manufacturing the flame-retardant seamless belt of the present invention, it is possible to uniformly disperse the anion-containing salt shown by the chemical 1 in the belt. Thus the method is capable of easily manufacturing the flame-retardant seamless belt having high performance.

The image-forming apparatus such as a copying apparatus, a facsimile, a printer, and the like having the flame-retardant seamless belt of the present invention is ionic-conductive and has a low electric resistance. However, the belt has a low degree of dependence on environment in its electric resistance and a slight variation in its in-plane variation in its electric resistance. Therefore the image-forming apparatus provides a uniform image. Further since the image-forming apparatus can be operated with a small power unit, the image-forming apparatus consumes a small electric power. In addition, it is possible to simplify the construction of the control system of the image-forming apparatus. Furthermore it is possible to reduce the number of operation tests in different environment and hence reduce the period of time and the cost required for development. Further members disposed on the periphery of the flame-retardant seamless belt are given a small burden. Moreover the flame-retardant seamless belt allows the image-forming apparatuses to provide images reliably for a long time. Furthermore the flame-retardant seamless belt allows the image-forming apparatus to be safe.

What is claimed is:

1. A flame-retardant seamless belt comprised of a thermoplastic composition containing a polyester thermoplastic elastomer as a main component thereof; at not less than 15 wt % and not more than 40 wt % of melamine cyanurate, serving as a flame-retardant additive, based on the total weight of said thermoplastic composition; and not less than 0.01 parts by weight and not more than three parts by weight of an anion-containing salt, shown by a chemical formula (1) shown below, per 100 parts by weight of an entire polymer component, wherein said thermoplastic composition has a volume resistivity of not less than $1.0 \times 10^6 \Omega \cdot cm$ and not more than $1.0 \times 10^{12} \Omega \cdot cm$:

(I)

where $X_1$ and $X_2$ each denote a functional group containing C, —F, and —$SO_2$—, whose number of carbon atoms is one to eight.

2. The flame-retardant seamless belt according to claim 1, wherein said $X_1$— of said chemical formula (1) is $C_{n1}H_{m1}F_{(2n1-m1+1)}$—$SO_2$—, and said $X_2$— of said chemical formula (1) is $C_{n2}H_{m2}F_{(2n2-m2+1)}$—$SO_2$— wherein n1 and n2 are integers not less than 1, and m1 and m2 are integers not less than 0.

3. The flame-retardant seamless belt according to claim 1, wherein a cation making a pair with said anion, of said chemical formula (1), which constitutes said salt is a cation of any one of alkali metals, group 2A metals, transition metals, and amphoteric metals.

4. The flame-retardant seamless belt according to claim 3, wherein said cation comprises lithium.

5. The flame-retardant seamless belt according to claim 1, wherein said anion-containing salt is lithium-bis (trifluoromethanesulfonyl) imide.

6. The flame-retardant seamless belt according to claim 1, wherein said anion-containing salt of said chemical formula 1 is added to said entire polymer component without intermediary of a medium consisting of a low-molecular-weight polyether-containing compound or a low-molecular-weight polar compound whose molecular weight is not more than 10000.

7. The flame-retardant seamless belt according to claim 1, wherein when the volume resistivity of said flame-retardant seamless belt measured at a low temperature of 10° C. and a low humidity of 15% is $R_{LL}$ and that a volume resistivity thereof measured at a high temperature of 32.5° C. and a high humidity of 90% is $R_{HH}$, the volume resistivity $R_{LL}$ and the volume resistivity $R_{HH}$ satisfy an equation of $\log_{10} R_{LL} - \log_{10} R_{HH} \leq 2.5$.

8. The flame-retardant seamless belt according to claim 1, having at least one coating layer on a peripheral surface thereof.

9. A method of manufacturing a flame-retardant seamless belt comprising the steps of:

fusing and kneading, in an extruder a conductive master batch containing a polyester thermoplastic elastomer and not less than one wt % and not more than 20 wt % of an anion-containing salt, shown below by a chemical formula (1), added to said polyester thermoplastic elastomer; a flame-retardant additive; and a thermoplastic composition containing said polyester thermoplastic elastomer as a main component thereof to form a material for said flame-retardant seamless belt; and extruding said material from an annular die and molding said material into a shape of a belt by using a sizing die,

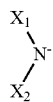
(I)

wherein $X_1$ and $X_2$ each denote a functional group which contains C, —F, and —SO$_2$— and in which the number of carbon atoms is one to eight.

10. The method according to claim 9, wherein said flame-retardant additive and said thermoplastic composition containing said polyester thermoplastic elastomer as said main component thereof are kneaded and supplied to said extruder as a flame-retardant master batch; and said mixture of said conductive master batch and said flame-retardant master batch are extruded vertically from said annular die.

11. An image-forming apparatus having said flame-retardant seamless belt according to claim 1.

12. The flame-retardant seamless belt according to claim 1, comprising not less than 20 wt % and not more than 35 wt % of melamine cyanurate, serving as a flame-retardant additive.

13. The flame-retardant seamless belt according to claim 1, wherein said volume resistivity is not less than $1.0\times10^6\Omega\cdot cm$ and not more than $1.0\times10^{11}\Omega\cdot cm$.

14. The flame-retardant seamless belt according to claim 1, wherein said polyester thermoplastic elastomer is a copolymer of a hard segment consisting of polyester having an aromatic ring and a low-melting point soft segment consisting of a polyether and/or polyester.

* * * * *